United States Patent
Laaja

(10) Patent No.: US 6,299,134 B1
(45) Date of Patent: Oct. 9, 2001

(54) VALVE FOR ADJUSTING MASS FLOW

(75) Inventor: Risto Laaja, Kangasala (FI)

(73) Assignee: Tasowheel Oy (FI)

( * ) Notice: Subject to any disclaimer, the term of this patent is extended or adjusted under 35 U.S.C. 154(b) by 0 days.

(21) Appl. No.: 09/462,278

(22) PCT Filed: Jul. 7, 1998

(86) PCT No.: PCT/FI98/00575

§ 371 Date: Jan. 6, 2000

§ 102(e) Date: Jan. 6, 2000

(87) PCT Pub. No.: WO99/02903

PCT Pub. Date: Jan. 21, 1999

(30) Foreign Application Priority Data

Jul. 7, 1997 (FI) .................................................. 972877

(51) Int. Cl.[7] .................................. F16K 1/52; F16K 3/26
(52) U.S. Cl. ............................................................. 251/205
(58) Field of Search ................................................ 251/205

(56) References Cited

U.S. PATENT DOCUMENTS

| | | | | |
|---|---|---|---|---|
| 2,980,392 | * | 4/1961 | Greenwood | 251/205 X |
| 3,384,338 | * | 5/1968 | Dermody | 251/205 |
| 4,283,041 | | 8/1981 | Kujawski | . |
| 5,150,734 | * | 9/1992 | Chiba | 251/205 X |
| 5,516,079 | | 5/1996 | Baumann | . |

* cited by examiner

Primary Examiner—Kevin Lee
(74) Attorney, Agent, or Firm—Larson & Taylor, PLC

(57) ABSTRACT

A valve includes a closing element which moves axially in the bushing. The flow entering the valve is directed towards the lower end of a closing element. The outflow is through a port in the wall of bushing. In the lower end of the closing element, there is a groove portion with a straight bottom which deepens towards the flow direction and steers the outlet flow to the port orifice. The groove is formed only in a part of the closing element lower end.

11 Claims, 1 Drawing Sheet

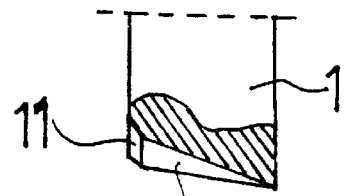
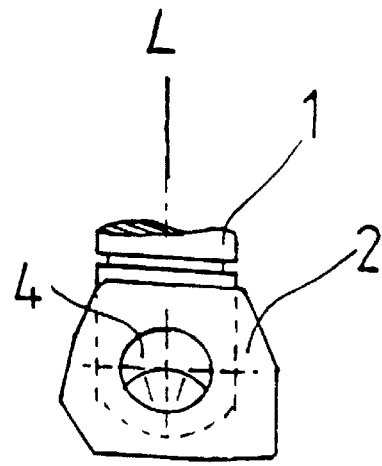
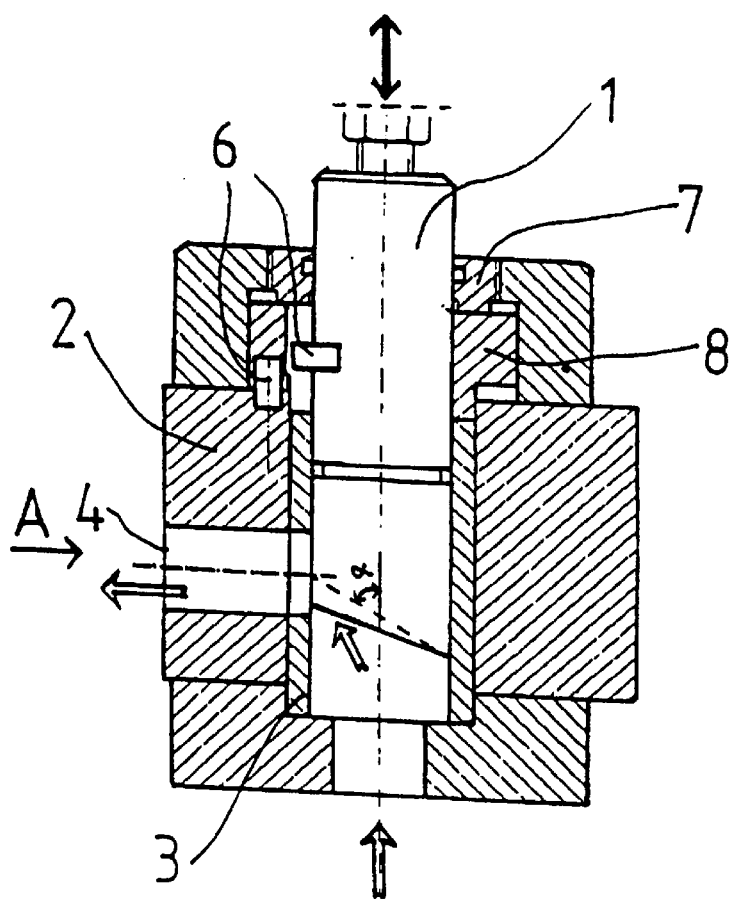
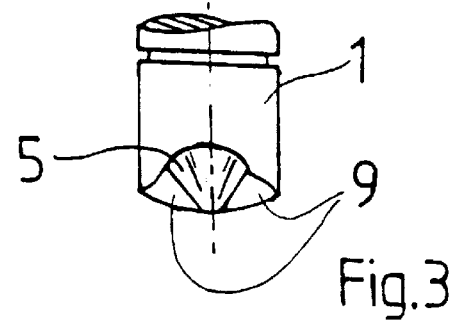
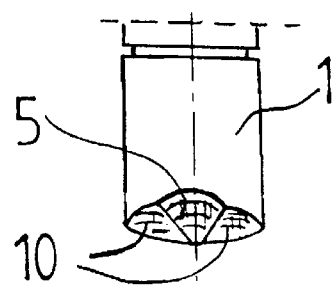
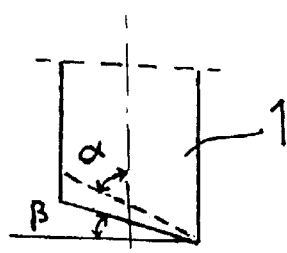

VALVE FOR ADJUSTING MASS FLOW

BACKGROUND OF THE INVENTION

The invention relates to a valve for stream flow adjustment as per the introductory chapter of claim 1.

FIELD OF THE INVENTION

Many types of valves are known, where the construction of the closing element varies according to the purpose of use and in order to achieve a required characteristic curve. For stream adjustment valves have been used, to the spindle of which for the adjusting function a linear motion is brought. The spindle linear motion opens or closes the port. A problem has been accumulation of sludge or mass contained in the flow, which has caused changes in the qualities of flow and penetration of mass to the sliding surfaces of flow or corresponding closing element, which has caused valve stagnations.

For instance, the printed German patent specifications 691334 and 625297 disclose valves with a small pressure drop in the opened state, but disturbed flow in intermediate positions. Disturbance only occurs in the flow after the closing element. These valves are not suitable as adjusting valves for mass flow.

SUMMARY OF THE INVENTION

By means of a valve according to this invention the frequent problems are avoided and substantially better qualities by mass flow adjustment achieved.

The advantage of the invention is that on the most used part of the characteristic curve stream flow takes place cleaning the valve so that there is no sludge accumulation in the valve interior part, flow takes place with a pressure drop proper to the use and the dependence of flow quantity on the linear motion is easily determined or known. When the adjustable flow hits the beveled lower surface of the closing element, the pressure drop then begins to form already at the closing element.

BRIEF DESCRIPTION OF THE DRAWINGS

In the following the invention is disclosed with reference to the enclosed drawing, where FIG. 1 is the cross profile of the valve.

FIG. 2 is the valve viewed from the port direction.

FIG. 3 is the lower end of the spindle working as closing element.

FIG. 4 is a side view of the closing element lower end.

FIG. 5 is another embodiment of the closing element lower end.

FIG. 6 is the cross profile of the closing element lower end.

DESCRIPTION OF THE PREFERRED EMBODIMENTS

FIG. 1 shows a valve, where, in the face portion 2, an outlet 4 is drilled as well as a cylindrical bore, perpendicular to said outlet, for the valve closing element 1 and its bushing 3. For adjustment of the outlet size the closing element 1 is moved linearly in bushing 3. Most favorably, the bushing is of plastic, Teflon®, for instance, whereas closing element 1 can even be compressed in order to produce sealing but retaining the sliding capacity of the closing element due to the excellent sliding qualities of Teflon®. By means of this solution penetration of sludge and liquid between closing element 1 and bushing 3 is avoided. Compression is produced for instance in dimensioning the bushing 3 diameter with respect to the bore in housing 2 and the closing element 1 diameter. Another alternative is a tension nut 7 by means of which flange ring 8 is tensioned towards bushing 3 making it press bushing 3 longitudinally. The compressed bushing tightens the sliding surfaces.

Elements 6 are rotation stoppers. One of them prevents the flange ring 8 from rotating by leaning on housing 2 and the other one prevents the closing element 1 from rotating by leaning on the flange ring 8 groove.

FIG. 2 shows how the port orifice is formed between closing element 1 lower end and flow channel portion 4. The lower end of closing element 1 is beveled and includes a groove 5 growing deeper from the inside so that this groove 5 is deepest on the closing element edge from where the flow to outlet 4 takes place. The Dh ratio of outlet 4 hydraulic diameter to the closing element 1 hydraulic diameter ranges from 50 to 120%. The hydraulic diameter Dh=4×cross-area/perimeter.

FIG. 3 shows simply the lower end of the closing element 1 illustrating the formation of the beveled groove portion 5. The oblique angle of groove 5 bottom with respect to the closing element longitudinal axis ranges from 80° to 20°. The groove is only on a part of the closing element lower end surface By oblique angle β levels 9 remain on both sides of groove 5. The ratio of groove 5 groove portion groove-diameter to outlet 4 hydraulic diameter Dh in the most narrow port orifice most favorably ranges from 50 to 120%. Flow channel 4 is circular or it can also be a slightly elliptic or oval hole or a quadrangle with rounded corners at bushing 3. In the invention it is favorable that only a part of the closing element lower surface is formed by the groove portion 5, then the flow can better find its way to outlet 4.

Consequently, the adjustable port is most suitably transformed as an orifice restricted by the side projection of two circular or two slightly elliptic openings. A part of the flow gets into whirling immediately after the bushing 3 orifice and the whirl effect keeps channel portion 4 clean. With the valve fully open, there is hardly any whirling but, on the other hand, the velocity of flow hardly decreases after the orifice, which would result in accumulation of sludge.

FIG. 4 shows the oblique angle β of the closing element planelike lower end 9, which angle can vary within the range from 5° to 45°. The same range of variation suits also the oblique angle β of the groovelike lower face 10 in FIG. 5.

FIG. 5 shows the faces 10 on both sides of groove portion 5, which in the oblique angle β can also be groove portions in the flow direction, whose groove diameter is substantially greater than the groove diameter of groove 5.

FIG. 6 shows a bevel 11 made on the groove portion 5 outlet side in order to make the arrival of flow at port 4 edge more gentle. Also on the edge of port 4 orifice at bushing 3 there can be a bevel, especially in the lower part (FIG. 1), since in adjustment situations the valve is not even near to its closing position.

The bore for bushing 3 and closing element 1 can be round, oval, angular or a combination of the same.

What is claimed is:

1. A valve for adjusting mass flow, said valve comprising a housing having a cylindrical bore therein, a closing element moving axially in a bushing in the bore, the flow entering the valve via an inlet opening located towards a lower end of said closing element, said valve further comprising an outlet port in a wall of the bushing for the outlet flow, the lower end of the closing element having a groove portion with a straight bottom increasing in depth towards the flow direction and steering the flow to the outlet port, the edge of said outlet port throttling said flow, said groove forming only a part of the end of said closing element.

2. The valve according to claim 1 wherein an area of the lower end of the closing element located outside the groove portion comprises a beveled flow-direction-steering plane face.

3. The valve according to claim 1 wherein an area of the lower end of the closing element located outside the groove portion is groove-like, so that a groove radius of said lower face is substantially greater than a groove radius of the groove portion.

4. The valve according to claim 1 wherein the bottom line angle ($\alpha$) of the groove portion is within a range from 20° to 80°.

5. The valve according to claim 1 wherein a planelike or groovelike end face of the closing element located outside the groove portion is beveled with an angle ($\beta$) ranging from 5° to 45°.

6. The valve according to claim 1 wherein a ratio of a hydraulic diameter (Dh) of the outlet port to a hydraulic diameter of the closing element ranges from 50 to 120%.

7. The valve according to claim 1 wherein the ratio of a groove diameter of the groove portion to a hydraulic diameter of the closing element ranges from 50 to 120%.

8. The valve according to claim 1 wherein the groove portion comprises one of a cylindrical, a conical or an elliptical face.

9. The valve according to claim 1 wherein the bushing in the valve housing is replaceable.

10. The valve according to claim 1 wherein by means of a special clamping arrangement the bushing can be compressed around the closing element in order to produce a tightening effect.

11. The valve according to claim 1 wherein an outlet edge of the groove portion comprises a bevel.

* * * * *